United States Patent
Ho

(10) Patent No.: US 10,658,864 B2
(45) Date of Patent: May 19, 2020

(54) MULTIFUNCTIONAL WIRELESS CHARGING SYSTEM AND ITS DATA TRANSMISSION METHOD

(71) Applicant: FOXCONN INTERCONNECT TECHNOLOGY LIMITED, Grand Cayman (KY)

(72) Inventor: Yung-Hsien Ho, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 126 days.

(21) Appl. No.: 16/034,354

(22) Filed: Jul. 13, 2018

(65) Prior Publication Data

US 2019/0020214 A1  Jan. 17, 2019

(30) Foreign Application Priority Data

Jul. 13, 2017 (CN) .......................... 2017 1 0568695

(51) Int. Cl.
*H02J 7/02* (2016.01)
*H02J 7/00* (2006.01)
*G06F 21/60* (2013.01)
*H04W 12/06* (2009.01)
*G06F 21/46* (2013.01)
*H04B 5/00* (2006.01)
*H04W 12/00* (2009.01)
*G06F 21/44* (2013.01)
*H02J 50/80* (2016.01)
*H02J 50/10* (2016.01)

(52) U.S. Cl.
CPC .............. *H02J 7/027* (2013.01); *G06F 21/44* (2013.01); *G06F 21/46* (2013.01); *G06F 21/602* (2013.01); *G06F 21/606* (2013.01); *H02J 7/0042* (2013.01); *H02J 7/025* (2013.01); *H02J 50/80* (2016.02); *H04B 5/0037* (2013.01); *H04W 12/003* (2019.01); *H04W 12/06* (2013.01); *H02J 7/00034* (2020.01); *H02J 50/10* (2016.02)

(58) Field of Classification Search
CPC ............ H02J 7/027; H02J 50/80; H02J 7/025; H04W 12/003; G06F 21/44; G06F 21/606
USPC .................................................. 320/108, 106
See application file for complete search history.

(56) References Cited

U.S. PATENT DOCUMENTS

| | | | |
|---|---|---|---|
| 7,772,802 B2 | 8/2010 | Manico et al. | |
| 8,947,042 B2* | 2/2015 | Kirby ...................... | H02J 5/005 320/108 |
| 9,009,805 B1* | 4/2015 | Kirkby ............... | H04N 21/2187 726/7 |
| 9,793,738 B2 | 10/2017 | Jacobs et al. | |
| 9,953,174 B2* | 4/2018 | Niessen ................ | G06F 21/604 |

(Continued)

*Primary Examiner* — Richard V Muralidar
(74) *Attorney, Agent, or Firm* — Wei Te Chung; Ming Chieh Chang

(57) ABSTRACT

A multifunctional wireless charging system for wirelessly charging a mobile electronic device and simultaneously performing data transmission with the mobile electronic device comprises: a multifunctional wireless charging device including an outer case and a wireless charging module assembled in the outer case, the outer case defining a wireless charging area for displaying the mobile electronic device; wherein the multifunctional wireless charging device provides a wireless charging signal and simultaneously generates a random password for authentication of data transmission.

10 Claims, 5 Drawing Sheets

(56) References Cited

U.S. PATENT DOCUMENTS 10,055,575 B2 * 8/2018 Adams .................... H04L 63/06
2017/0341519 A1 * 11/2017 Ely ....................... B60L 11/182

* cited by examiner

MULTIFUNCTIONAL WIRELESS CHARGING SYSTEM AND ITS DATA TRANSMISSION METHOD

BACKGROUND OF THE INVENTION

1. Field of the Invention

The present invention relates generally to a multifunctional wireless charging system, and more particularly to a multifunctional wireless charging system for data transmission and a data transmission method thereof.

2. Description of Related Arts

U.S. Pat. No. 9,793,738 discloses a surface computing device configured for wireless charging. As configured, the device may detect and authenticate presence of an electronic device positioned on a surface of the surface computing device. For example, a mobile phone positioned on device may transmit a signal, via a wireless charging protocol, requesting a wireless charge, requesting establishment of a wireless data link, such as a Bluetooth connection, or both. A data link may comprise a Bluetooth connection, a Wi-Fi connection, a 60 GHz connection, or a UWB connection.

U.S. Pat. No. 7,772,802 discloses a charging display system in which graphic information related to a rechargeable device is displayed in at least a part of a graphic presentation portion of a display thereof. The process typically involves determining graphic information for presentation in the graphic presentation portion, arranging the graphic information for presentation within the graphic presentation portion, and generating a displayable output signal based on obtained graphic information. The graphic information may be related to the rechargeable device by being based upon, or associated with, one of a group of interaction options that, at least in part, define various interactions that can occur between the charging display system and the type of wirelessly rechargeable device. The interaction options can involve provision of instructions occasioning a specific use of the wirelessly rechargeable device. For example, some rechargeable devices are password protected so that they enable certain functions to be excited only when these wirelessly rechargeable devices have had particular codes entered into them using a user control system of such a rechargeable device. Similarly, the interaction options can involve diagnostic interactions wherein a user is called upon to make specific entries at the user control system so that the reaction, if any, of rechargeable device to such inputs can be sensed by a wireless communication system or device sensor of the charging display system allowing such a reaction or the absence of such a reaction to be detected.

SUMMARY OF THE INVENTION

An object of the present invention is to provide an improved multifunctional wireless charging system and data transmission having extended features and data transmission security.

To achieve the above-mentioned object, a multifunctional wireless charging system for wirelessly charging a mobile electronic device and simultaneously performing data transmission with the mobile electronic device comprises: a multifunctional wireless charging device including an outer case and a wireless charging module assembled in the outer case, the outer case defining a wireless charging area for displaying the mobile electronic device; wherein the multifunctional wireless charging device provides a wireless charging signal and simultaneously generates a random password for authentication of data transmission.

DETAILED DESCRIPTION OF THE PREFERRED EMBODIMENT

Figure 1:
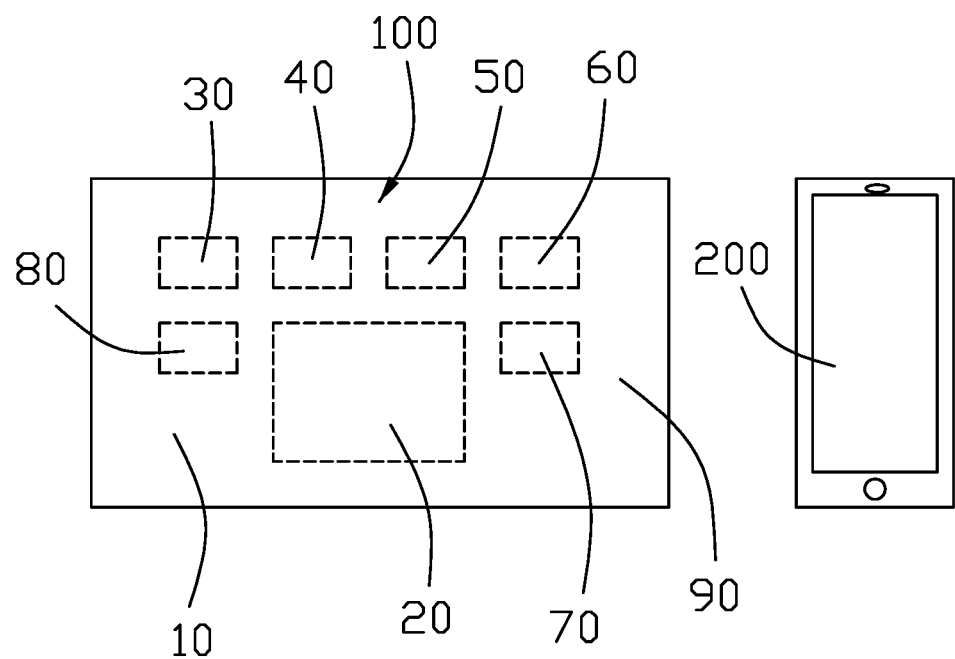
FIG. 1 is a structure view of a multifunctional wireless charging device in accordance with the present invention and a mobile electronic device.

Referring to FIGS. 1 to 7, a multifunctional wireless charging system in accordance with the present invention includes a multifunctional wireless charging device 100. The preferred embodiment of the multifunctional wireless charging device 100 includes an outer case 10, a wireless charging module 20 disposed in the outer case 10, a video interface module 30, a audio interface module 40, a USB interface module 50, a Ethernet interface module 60, a print interface module 70, and a expansion interface module 80. A wireless charging area 90 is provided on the outer case 10 of the multifunctional wireless charging device 100. The size of the wireless charging area 90 is determined by the wireless signal transmission range of the wireless charging module 20. The multifunctional wireless charging device 100 of the present invention may also be equipped with a display device (not shown) electrically connected to the video interface module 30. The multifunctional wireless charging device 100 of the present invention is used to wirelessly charge a mobile electronic device 200 and simultaneously perform data transmission with the mobile electronic device 200. The mobile electronic device 200 may be a notebook, a battery storage device, a mobile phone, or a PC, such as electrically-transmissible electronic devices. The mobile electronic device 200 can perform data transmission with the transmission protocol of the multifunctional wireless charging device 100 and the data can be in the form of video data, network data, print data, and other forms of data. The multifunctional wireless charging device 100 can be used by the video interface module 30, the audio interface module 40, the USB interface module 50, the Ethernet interface module 60, the print interface module 70 and the expansion interface module 80 to make data utilization and exchange with other devices (eg, display devices, printing devices, mice, data entry devices, Audio playback devices, routers, etc.).

Figure 4:
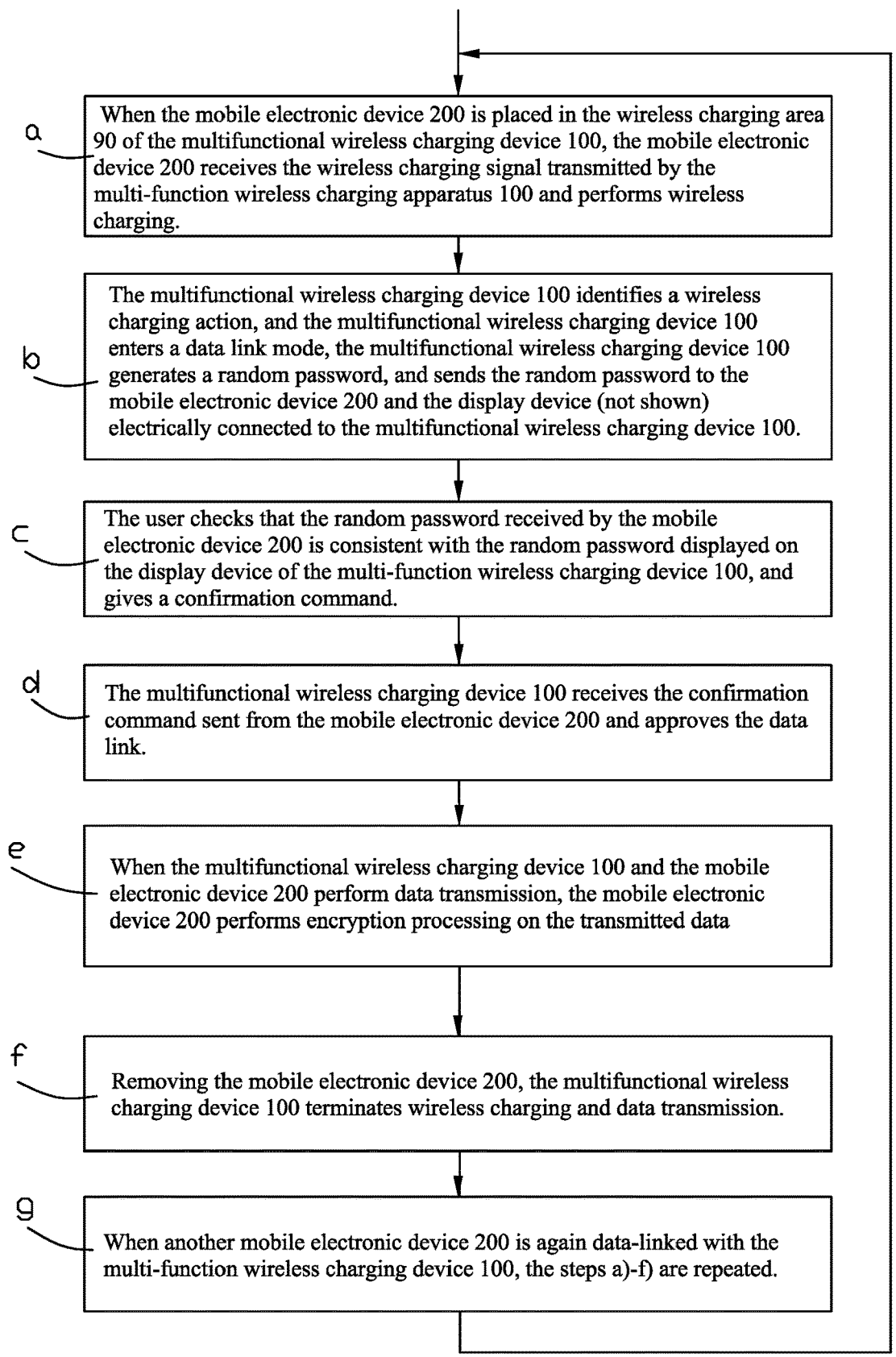
FIG. 4 is a flow chart of wireless charging and data transmission processing of the multifunction wireless charging device electrically connected to a display device as shown in FIG. 1 for a mobile electronic device with a controllable display screen.
Figure 5:
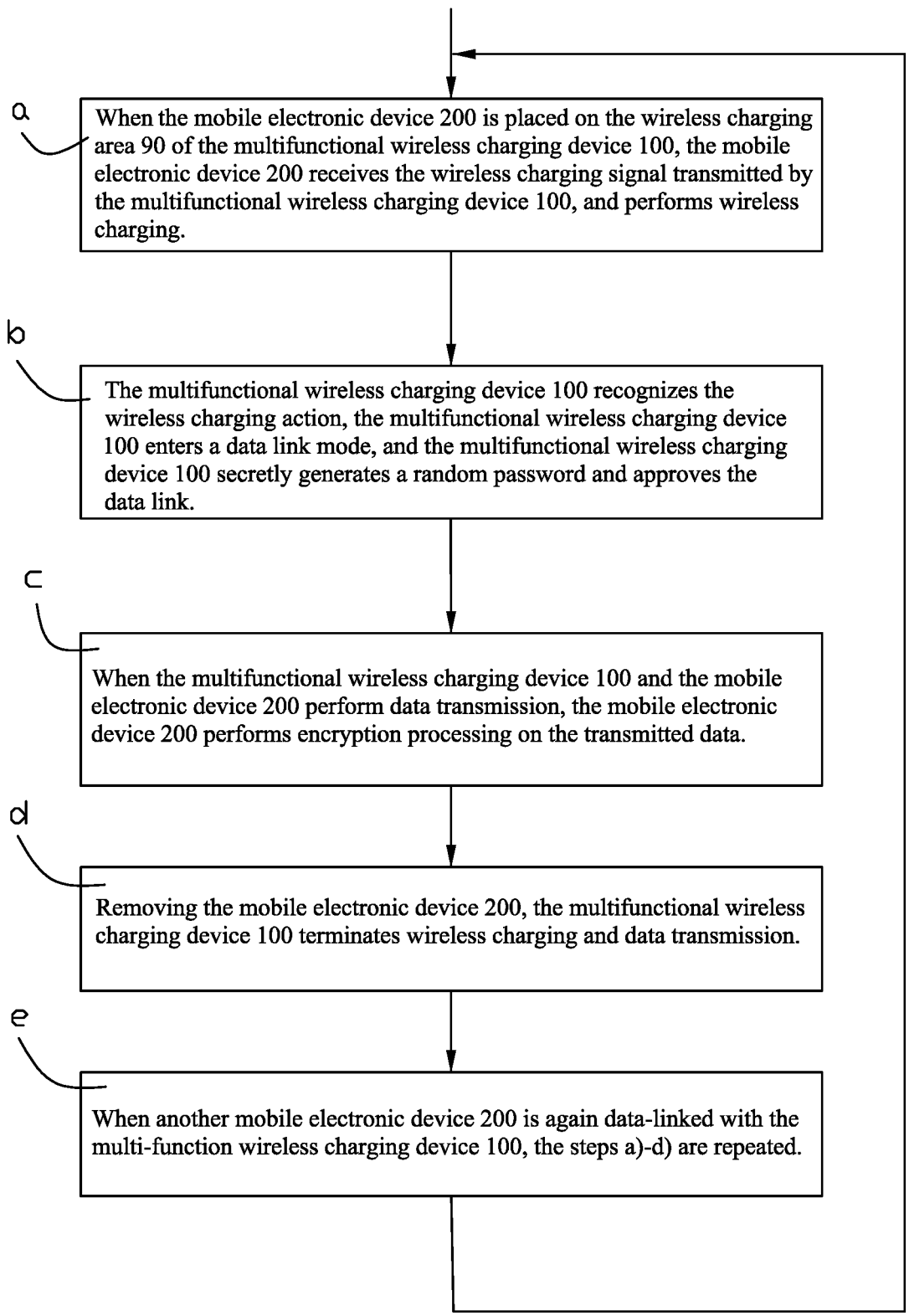
FIG. 5 is a flow chart of the wireless charging and data transmission processing of a multifunctional wireless charging device for a mobile electronic device as shown in FIG. 1.

Referring to FIGS. 4 to 5, when the multifunctional wireless charging device 100 of the present invention is electrically connected to a display device and the mobile electronic device 200 has a controllable display screen, the multifunctional wireless charging device 100 performs wireless charging connection and data transmission with the mobile electronic device 200, and the process is as follows:

a) When the mobile electronic device 200 is placed in the wireless charging area 90 of the multifunctional wireless charging device 100, the mobile electronic device 200 receives the wireless charging signal transmitted by the multi-function wireless charging apparatus 100 and performs wireless charging.

b) The multifunctional wireless charging device 100 identifies a wireless charging action, and the multifunctional wireless charging device 100 enters a data link mode, the multifunctional wireless charging device 100 generates a random password, and sends the random password to the mobile electronic device 200 and the display device (not shown) electrically connected to the multifunctional wireless charging device 100.

c) The user checks that the random password received by the mobile electronic device 200 is consistent with the random password displayed on the display device of the multi-function wireless charging device 100, and gives a confirmation command.

d) The multifunctional wireless charging device 100 receives the confirmation command sent from the mobile electronic device 200 and approves the data link.

e) When the multifunctional wireless charging device 100 and the mobile electronic device 200 perform data transmission, the mobile electronic device 200 performs encryption processing on the transmitted data.

f) Removing the mobile electronic device 200, the multifunctional wireless charging device 100 terminates wireless charging and data transmission.

g) When another mobile electronic device 200 is again data-linked with the multi-function wireless charging device 100, the steps a)-f) are repeated.

When the multifunctional wireless charging device 100 of the present invention does not have an electrically connectable display device, or the mobile electronic device 200 has no controllable display screen, the multifunctional wireless charging device 100 performs wireless charging connection and data transmission with the mobile electronic device 200, and the process is as follows:

a) When the mobile electronic device 200 is placed on the wireless charging area 90 of the multifunctional wireless charging device 100, the mobile electronic device 200 receives the wireless charging signal transmitted by the multifunctional wireless charging device 100, and performs wireless charging.

b) The multifunctional wireless charging device 100 recognizes the wireless charging action, the multifunctional wireless charging device 100 enters a data link mode, and the multifunctional wireless charging device 100 secretly generates a random password and approves the data link.

c) When the multifunctional wireless charging device 100 and the mobile electronic device 200 perform data transmission, the mobile electronic device 200 performs encryption processing on the transmitted data.

d) Removing the mobile electronic device 200, the multifunctional wireless charging device 100 terminates wireless charging and data transmission.

e) When another mobile electronic device 200 is again data-linked with the multi-function wireless charging device 100, the steps a)-d) are repeated.

Figure 2:
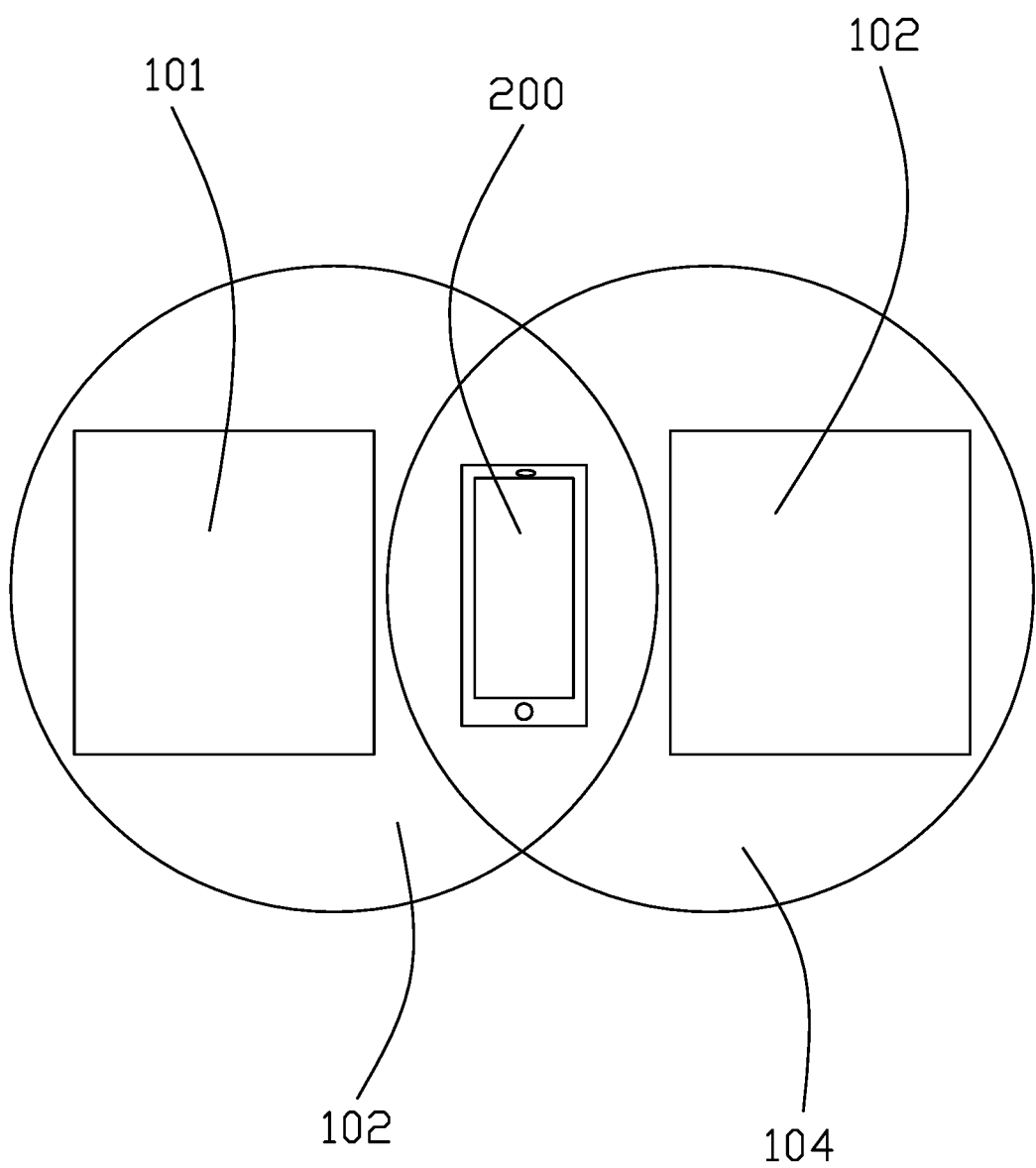
FIG. 2 is a schematic view of a location where two multifunction wireless charging devices and a mobile electronic device are identified as shown in FIG. 1.
Figure 3:
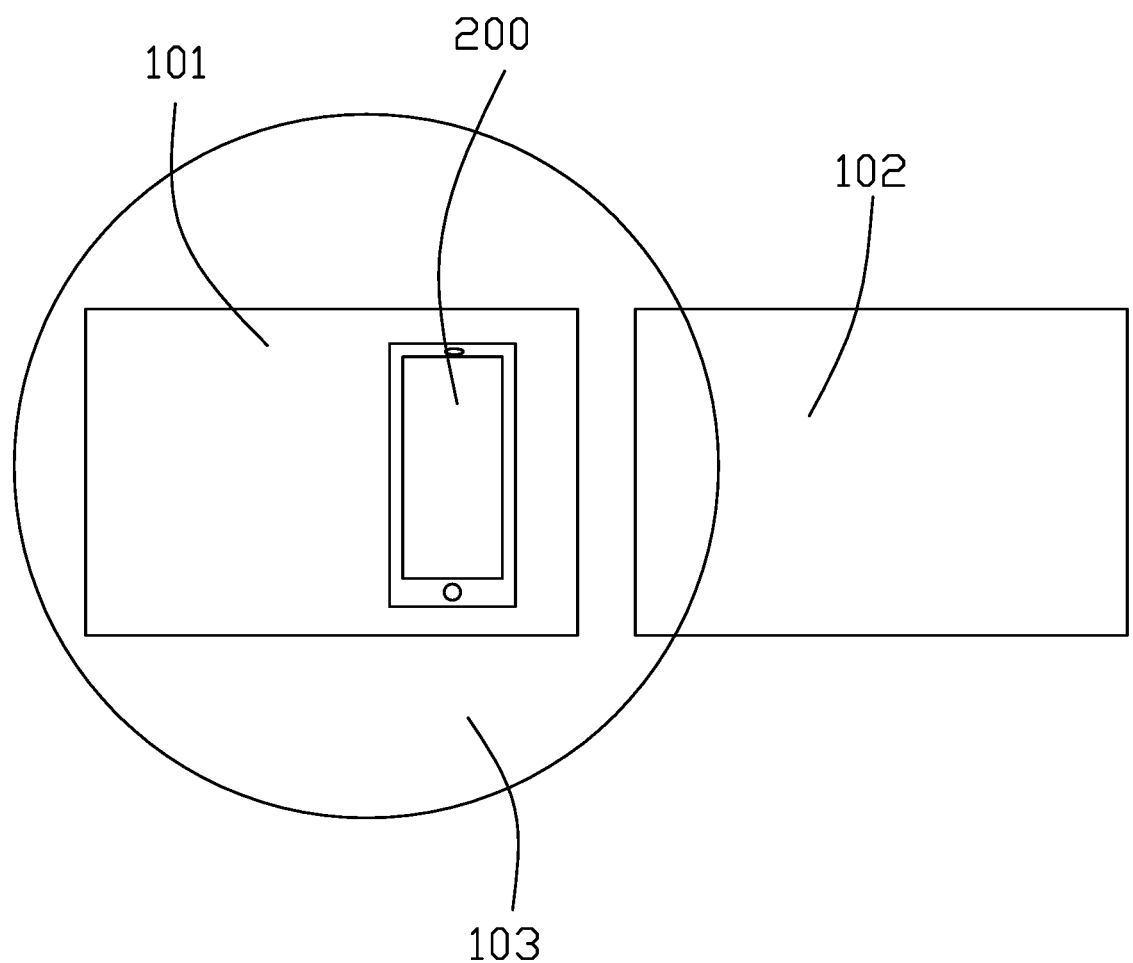
FIG. 3 is a schematic view of the location of the confidential data transmission between two multifunctional wireless charging devices and the mobile electronic devices shown in FIG. 1.

Referring to FIGS. 2 to 3, when the mobile electronic device 200 is placed between two multifunctional wireless charging devices 100 (the multifunctional wireless charging device 101 and the multifunctional wireless charging device 102, respectively, having a first data transmission range 103 and the second data transmission range 104). As shown in FIG. 2, since the mobile electronic device 200 does not enter the wireless charging area of the multifunctional wireless charging device 101 and the multifunctional wireless charging device 102, therefore, the wireless charging function does not start, at this time, neither the multi-function wireless charging device 101 nor the multi-function wireless charging device 102 will be paired with the mobile electronic device 200, so no malfunction will occur. As shown in FIG. 3, after the mobile electronic device 200 is placed on the multifunctional wireless charging device 101, the multifunctional wireless charging device 101 initiates wireless charging for the mobile device 200. Since the mobile electronic device 200 is within the first data transmission range 103 of the multifunctional wireless charging device 101, the multifunctional wireless charging device 101 and the mobile electronic device 200 perform data link mode authentication. After the multifunctional wireless charging device 101 and the mobile electronic device 200 are authenticated in the data link mode, the mobile electronic device 200 and the multifunctional wireless charging device 101 perform data transmission in a unique and encrypted manner, even if there is other devices may intercept the signal midway, since there is no encryption password, the signal cannot be hacked, so confidentiality can be achieved.

What is claimed is:

1. A multifunctional wireless charging system for wirelessly charging a mobile electronic device and simultaneously performing data transmission with the mobile electronic device, comprising:
   a multifunctional wireless charging device including an outer case and a wireless charging module assembled in the outer case, the outer case defining a wireless charging area for displaying the mobile electronic device; wherein
   the multifunctional wireless charging device provides a wireless charging signal and simultaneously generates a random password for authentication of data transmission.

2. The multifunctional wireless charging system as claimed in claim 1, wherein the random password is generated secretly and secretly approved.

3. The multifunctional wireless charging system as claimed in claim 2, wherein the wireless multi-function wireless charging device is connected to a display device through a video interface module, and the mobile electronic device includes a controllable display screen, and the random password is displayed on the display device and the controllable display screen of the mobile electronic device, and the user confirms the random password displayed on the controllable display screen is consistent with the random password displayed on the display screen, and then controls the controllable display screen of the mobile electronic device to give a confirmation command.

4. The multifunctional wireless charging system as claimed in claim 2, wherein the multifunctional wireless charging device performs data transmission with the mobile electronic device, the mobile electronic device encrypts the transmitted data.

5. The multifunctional wireless charging system as claimed in claim 4, wherein the multifunctional wireless charging device is further provided with one or more of an audio interface module, a USB interface module, an Ethernet interface module, a print interface module, and an expansion interface module for data utilization and exchange with other devices.

6. A date transmission method of using a multifunctional wireless charging device to wirelessly charge a mobile electronic device, the multifunctional wireless charging device comprising an outer case defining a wireless charging area thereon and a wireless charging module installed in the outer case, the data transmission method comprising the following steps in sequence:
   (a) when the mobile electronic device is placed in the wireless charging area of the multifunctional wireless charging device, the mobile electronic device receives the wireless charging signal transmitted by the multifunctional wireless charging device and performs wireless charging;
   (b) the multifunctional wireless charging device identifies the wireless charging action to enter a data link mode, and the multifunctional wireless charging device generates a random password for data transmission authentication with the mobile electronic device.

7. The date transmission method as claimed in claim 6, wherein the multifunctional wireless charging device is electrically connected to a display device through a video interface module, the mobile electronic device has a controllable display screen, and the data transmission method further includes the following steps:
   (c) generating by the multifunctional wireless charging device a random password, displaying the random password on the controllable display screen, and sending the random password to the display device;
   (d) checking that the random password displayed on the controllable display screen of the mobile electronic device is consistent with the random password displayed on the display device and giving a confirmation command by the controllable display screen.

8. The date transmission method as claimed in claim 7, further comprising the following steps:
   (e) when the multifunctional wireless charging device performs data transmission with the mobile electronic device, the mobile electronic device encrypts the transmitted data;
   (f) remove the mobile electronic device, and the multifunctional charging device terminates the wireless charging and data transmission;
   (g) when another mobile electronic devices is again data-linked with the multifunctional wireless charging device, the steps (a) through (f) are repeated.

9. The date transmission method as claimed in claim 6, further comprising the following step:
   (c) the random password is secretly generated by the multifunctional wireless charging device and the data link is then approved.

10. The date transmission method as claimed in claim 9, further comprising the following steps:
   (d) when the multifunctional wireless charging device performs data transmission with the mobile electronic device, the mobile electronic device encrypts the transmitted data
   (e) remove the mobile electronic device, the multifunctional wireless charging device terminating the wireless charging and data transmission;
   (f) when another mobile electronic device is again data-linked with the multifunctional wireless charging device, the steps (a) through (e) are repeated.

* * * * *